United States Patent [19]
Tripod

[11] Patent Number: 5,652,482
[45] Date of Patent: Jul. 29, 1997

[54] BIDIRECTIONAL DEFLECTION AND DISPLAY SYSTEMS

[75] Inventor: Luc Tripod, Zurich, Switzerland

[73] Assignee: RCA Thomson Licensing Corporation, Princeton, N.J.

[21] Appl. No.: 714,034

[22] Filed: Sep. 12, 1996

Related U.S. Application Data

[63] Continuation of Ser. No. 348,793, Dec. 2, 1994, abandoned.

[30] Foreign Application Priority Data

Dec. 10, 1993 [GB] United Kingdom ............... 9325371

[51] Int. Cl.$^6$ ............................................. H01J 29/56
[52] U.S. Cl. ............................................. 315/370
[58] Field of Search ............................. 315/370, 371

[56] References Cited

U.S. PATENT DOCUMENTS

| | | | |
|---|---|---|---|
| 4,956,585 | 9/1990 | Rilly | 315/371 |
| 5,428,271 | 6/1995 | Watanabe et al. | 315/396 |

OTHER PUBLICATIONS

Gangolf Hirtz et al., *Symmetrical Deflection For Future IDTV/HDTV Receivers*, Jun. 1993, Paper of the IEEE, pp. 225–233, Chicago.

Uwe E. Kraus, *Symmetrical Line Deflection For Color TV Receivers With Enhanced Picture Quality*, Aug. 1985, IEEE Transactions on CE, vol. CE–31, No. 3, pp. 255–261.

Uwe E. Kraus et al., *100Hz Test–Receiver With Sinusoidal Line–Deflection*, Paper of the IEEE (International Conference on CE), Jun. 6–9, 1989, pp. 262–263, Chicago.

Primary Examiner—Theodore M. Blum
Attorney, Agent, or Firm—Joseph S. Tripoli; Joseph J. Laks; Thomas F. Lenihan

[57] ABSTRACT

A symmetrical square wave, having zero average value, is coupled to the input of a horizontal deflection yoke through an S-shaping capacitance. A negative resistance coupled to the output of the yoke has a negative resistance value which compensates for resistive losses in the yoke. A yoke current generated in the yoke will be a symmetrical triangular waveform. A first control loop adjusts the negative resistance value to assure successive zero value crossings of the yoke current are coincident in time with each center of successive horizontal scan lines. A second control loop adjusts the square wave to assure successive level transitions of the square wave are coincident in time with successive changes of scanning direction.

17 Claims, 10 Drawing Sheets

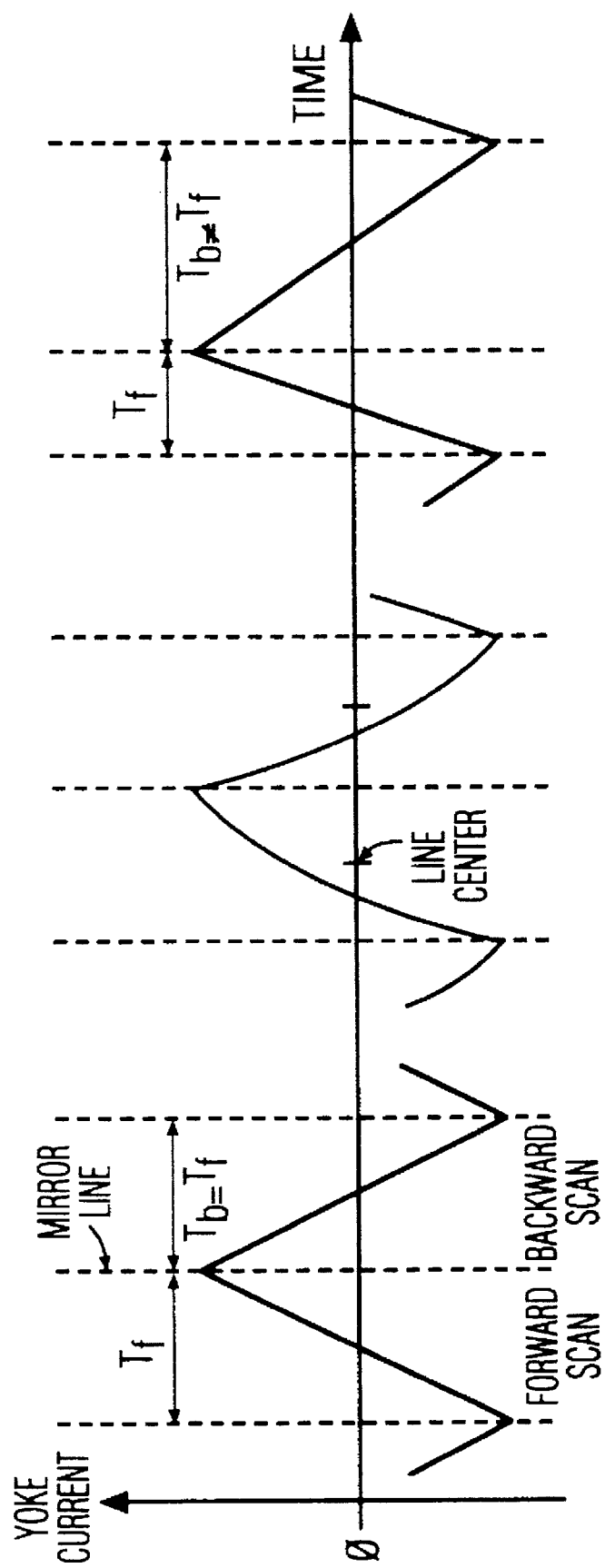

BIDIRECTIONAL DEFLECTION AND DISPLAY SYSTEMS

CROSS REFERENCE TO RELATED APPLICATIONS

This is a continuation of application Ser. No. 08/348,793, filed Dec. 2, 1994, and now abandoned.

BACKGROUND OF THE INVENTION

1. Field of the Invention

This invention relates to the field of bidirectional scanning in television receivers, video monitors and other raster scanned displays.

2. Statement of Related Art

Direct view cathode ray tube (CRT) display systems employ magnetic deflection and unidirectional scanning using a sawtooth to current with a fast flyback. With the introduction of high definition television (HDTV) and signal processing techniques improving picture quality, displays with higher horizontal scanning rates, for example up to 64 kHz, are desirable. A scanning rate of 64 kHz corresponds to $4f_H$, where $f_H$ is a conventional horizontal scanning rate, for example is 15.734 kHz. Due to the short flyback time, sawtooth line deflection results in high energy losses, for example, approximately 70 watts (W) at 64 kHz, strong radiation problems and increased loading of the line output transistor. These drawbacks can be overcome by using bidirectional deflection, where both forward and backward scans are used for video display. The general principle of bidirectional scanning is shown in FIG. 1. Lines of the raster are alternately scanned in the forward direction (left to right) and in the reverse direction (right to left). There is no flyback, as in a forward only scanned raster. Vertical deflection is constant during each line scan.

The main problem in bidirectional deflection systems is to achieve a good alignment of two adjacent lines to avoid the zip-fastener effect. A bidirectional raster with good alignment is shown in FIG. 2(a). A bidirectional raster with bad alignment, evidenced by the zip-fastener effect, is shown in FIG. 2(b).

Bidirectional scanning in accordance with prior art techniques utilizes a sinusoidal horizontal deflection waveform.

SUMMARY OF THE INVENTION

Measurements have shown that the hysteresis of the ferrite of the yoke has only a marginal effect on spot placement (for example, +/−0.8 mm at the center of a 36" tube). Therefore, in a first approach, it is sufficient to guarantee a high degree of mirror symmetry of the slopes of the yoke current of forward and backward scan, as shown in FIG. 3(a), for a good video line alignment.

In contrast to sinusoidal deflection as proposed in the prior art, "S"-shaped triangular sweep circuits allow the traditional non-blanking duty factor to increase from 80% to nearly 100%, that is, the horizontal blanking period is very, very short. Accordingly, an increase in brightness and horizontal resolution of 20% may be obtained without increasing the peak beam current. In the case of sinusoidal deflection, the active time is decreased to approximately 70%.

A line deflection circuit has an active switch for supplying a square wave shaped output voltage at half line frequency and with a duty factor of 50% to one terminal of the deflection coil. The other is coupled to the output of a power amplifier which is used mainly as a negative resistance for the deflection current. A tangential capacitor may be connected in series with the yoke. The zero crossing instant of the deflection current is measured and kept line centered by controlling the value of the negative resistance. Other, secondary correction variables (e.g. getter losses and hysteresis compensation) may be fed to either input of the power amplifier.

A bidirectional horizontal deflection system in accordance with the invention comprises: a horizontal deflection yoke having input and output terminals; a source of a symmetrical square wave signal, having zero average value; coupled to the input terminal; and, a negative resistance coupled to the output terminal and having a negative resistance value which compensates for resistive losses in the yoke, whereby a yoke current generated in the yoke responsive to the square wave signal will be a symmetrical triangular waveform. The square wave signal may be coupled to the input terminal through an S-shaping capacitance, which also assures the zero average value.

The system may further comprise a zero value crossing control loop for the yoke current, the negative resistance value being adjusted to assure successive zero value crossings of the yoke current are coincident in time with each center of successive horizontal scan lines. The zero value crossing control loop may comprise a phase detector for aligning in phase a level transition of a binary control signal in which the level transition coincides in time with each the center of the successive horizontal scan lines and each successive zero value crossing of the yoke current.

The system may further comprise a switching time control loop for the square wave signal, the source of the square wave being adjusted to assure successive level transitions of the square wave signal are coincident in time with successive changes of scanning direction. The signal representing the successive changes of scanning direction may have a 50% duty cycle, assuring the symmetry of the square wave signal.

The switching time control loop may comprise binary signal edge detectors which determine whether the level transitions of the square wave signal occur before or after level transitions of a binary control signal, the level transitions of the binary control signal being is coincident in time with successive changes of scanning direction.

The invention may also be embodied in a video display system, comprising: a video display; a video processor having memory blocks for storing successive lines of video data, a first set of alternate ones of the lines of video data being read from the memory blocks in forward order and a second set of remaining alternate lines of video being read from the memory blocks in reverse order; a horizontal deflection yoke having input and output terminals; a source of a symmetrical square wave signal, having zero average value, coupled to the input terminal; and, a negative resistance coupled to the output terminal and having a negative resistance value which compensates for resistive losses in the yoke, whereby a yoke current generated in the yoke responsive to the square wave signal will be a symmetrical triangular waveform.

The square wave signal may also be coupled to the input terminal through an S-shaping capacitance, which also assures the zero average value.

The video processor may generate a first control signal having level transitions identifying when one half of each successive video line has been read from one of the memory blocks and may generate a second control signal having level transitions identifying each change of scanning direction prior to reading each line of video from one of the memory blocks.

This system may also comprise a zero value crossing control loop for the yoke current and a switching time control loop for the square wave signal. The zero value crossing control loop may comprise a phase detector for aligning in phase the level transitions of the first control signal with each the successive zero value crossing of the yoke current. The switching time control loop may comprise binary signal edge detectors which determine whether the level transitions of the square wave signal occur before or after the level transitions of the second control signal.

BRIEF DESCRIPTION OF THE DRAWINGS

FIGS. 3(a), 3(b) and 3(c) are waveforms useful for explaining mirror symmetry of triangular deflection currents.

DETAILED DESCRIPTION OF THE PREFERRED EMBODIMENTS

Figure 1:
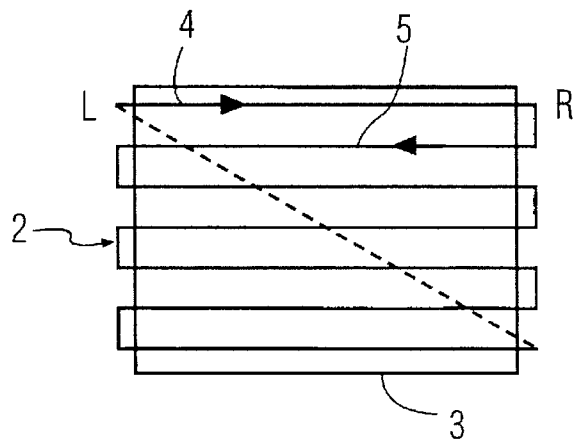
FIG. 1 is a diagram useful for explaining bidirectional scanning.

The general principle of bidirectional scanning is shown in FIG. 1. Lines of a raster 2 on a screen 3 are alternately scanned in the forward direction (left to right) as with line 4 and in the reverse direction (right to left) as with line 5. A first consequence of bidirectional scanning is that each line of video must be stored in a memory and every other stored line of video must be read out from the memory in reverse order. This is not difficult, or particularly expensive, in a receiver which is already adapted for digitizing video signals or receiving digital video signals. Such a receiver might utilize digitized video, for example, in order implement advanced display modes, to implement line doubling for double rate, noninterlaced horizontal scanning or to process digital source signals, just to name a few. A second consequence is that a vertical deflection circuit must be provided in which the lines are displayed as parallel and horizontally level, rather than with the small downward slope of a conventional raster. Such vertical deflection circuits are known in the art. A third consequence is that there is no flyback pulse, and therefore no flyback derived power supplies. The need for and expense of a high voltage power supply, and other power supplies derived therefrom must be considered. At some point however, for example perhaps at quadruple horizontal scanning rates, that is, $4f_H$, unidirectional scanning may be simply impractical.

Figure 2A:
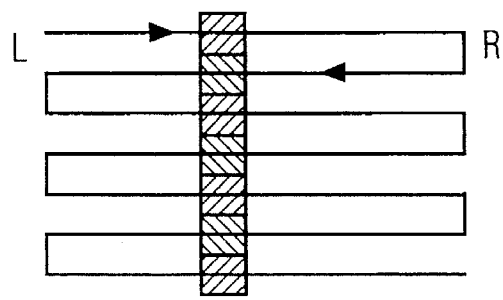
FIGS. 2(a) and 2(b) are useful for explaining good and bad line alignment, respectively, during bidirectional scanning.
Figure 2B:
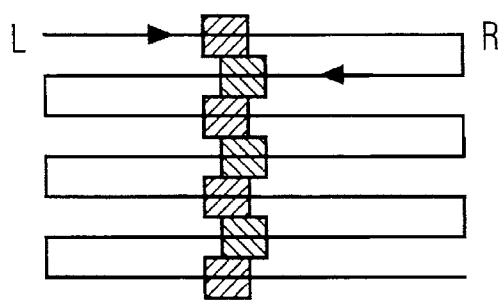

The main problem in bidirectional deflection systems is to achieve a good alignment of two adjacent lines to avoid the zip-fastener effect. A bidirectional raster with good alignment is shown in FIG. 2(a). Columns of pixels which should be vertically aligned are vertically aligned. A bidirectional raster with bad alignment, evidenced by the zip-fastener effect, is shown in FIG. 2(b). Columns of pixels which should be vertically aligned are not vertically aligned. A bidirectional raster with good alignment can be s achieved in accordance with inventive arrangements with a triangular deflection current.

A perfectly symmetrical triangular deflection current is shown in FIG. 3(a). The time period tf of the forward scanning equals the time period tb of the reverse scanning. A first kind of bad mirror symmetry is shown in FIG. 3(b), which occurs when the zero crossings of the deflection current are not centered on the horizontal lines. A second kind of bad mirror symmetry is shown in FIG. 3(c), which occurs when the square wave is not symmetrical. The time period tf of the forward scanning does not equal the time period tb of the reverse scanning.

Figure 4A:
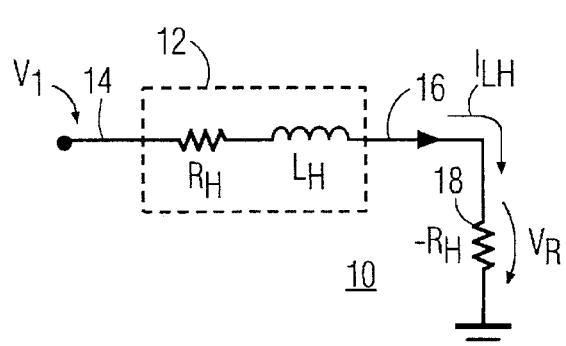
FIG. 4(a) are waveforms useful for explaining the operation of the circuit in FIG. 4(b).
Figure 4B:
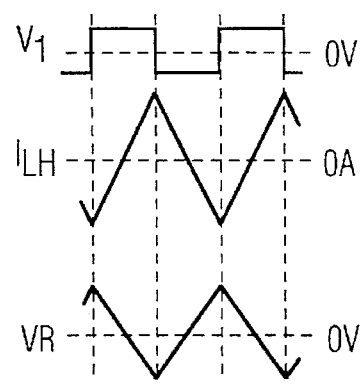
FIG. 4(b) is a diagram of a circuit useful for explaining the principle of generating a triangular deflection current.

FIG. 4a shows a basic triangular deflection circuit 10. Operational waveforms of circuit 10 are shown in FIG. 4b). A line deflection coil 12 has an input terminal 14 and an output terminal 16. The yoke has an inductance value of $L_H$ and a resistance value of $R_H$. The input terminal 14 terminal of the deflection coil is driven by a DC-free (zero average value) square wave voltage $V_1$ with a duty factor of exactly 50%. The output terminal 16 is coupled to a negative resistance 18, having a resistance value of $-R_H$, that compensates for the resistive losses of the yoke current (for example, copper, eddy current, switch resistance, etc.). The input square wave V1 "sees" a lossless inductance and the yoke current $I_{L_H}$ will be a true integral of the input voltage, namely a symmetrical triangular waveform. This current waveform fulfills the stringent requirements for mirror symmetry for bidirectional deflection, as shown in FIG. 3(a). The voltage VR across the negative resistance $-R_H$ is also a symmetrical triangular waveform.

Figure 5A:
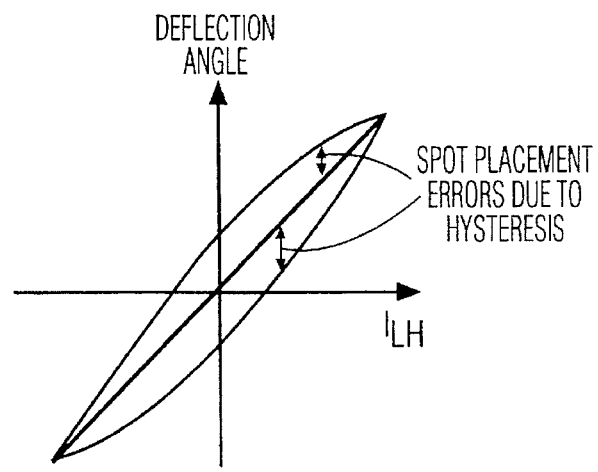
FIGS. 5(a) and 5(b) are waveforms useful for explaining the effects of hysteresis and compensation for hysteresis.
Figure 5B:
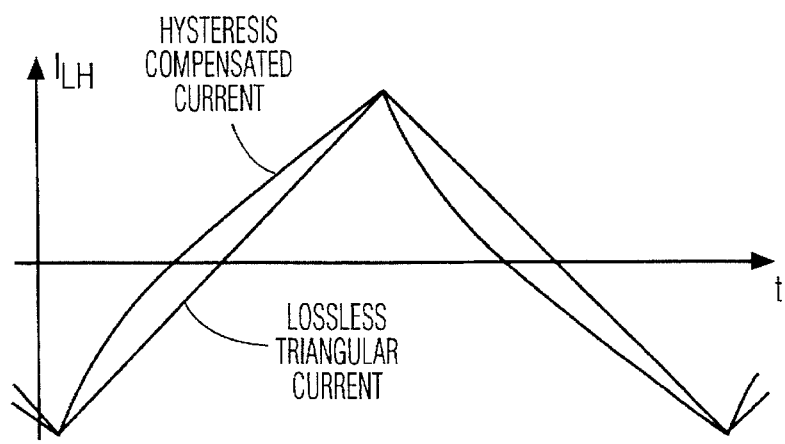
Figure 6:
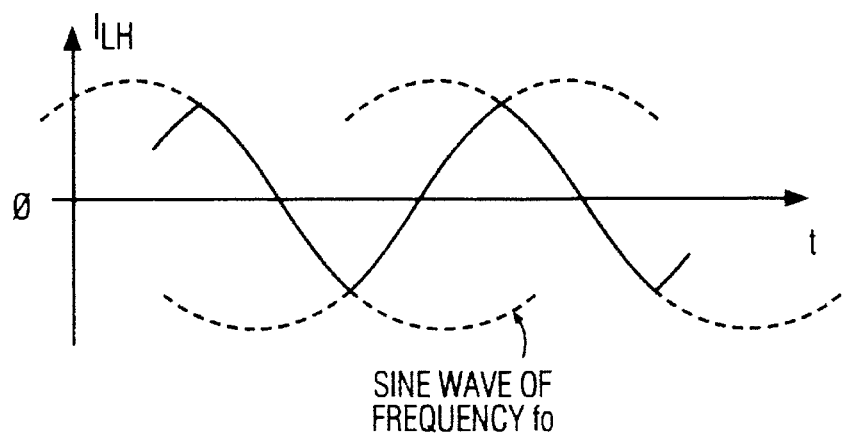
FIG. 6 is a waveform illustrating an S-shaped triangular deflection current.

In practice, the resistive losses in the yoke current are not completely made ineffective, since it is possible to compensate for small nonlinearity errors caused by hysteresis by leaving a small residual resistance in the yoke current loop. Beam spot placement errors are shown in FIG. 5(a). A capacitor can be connected in series with the yoke for two reasons: to block any DC component of the input square wave voltage; and, to give an "S"-shape to the deflection current, as required with modern picture tubes. Compensation for hysteresis nonlinearity is shown in FIG. 5(b). The resulting deflection current, as shown in FIG. 6, is the linear portion of an undamped sine wave with frequency $f_o$. Frequency $f_o$ is the resonant frequency of the series resonant circuit $L_H$ and $C_S$, where $L_H$ is the inductance of the yoke and $C_S$ is the S-shaping coupling capacitance. More particularly, the frequency $f_o$ may be stated as:

$$f_0 = \frac{1}{2\pi \sqrt{L_H C_S}}.$$

Figure 7:
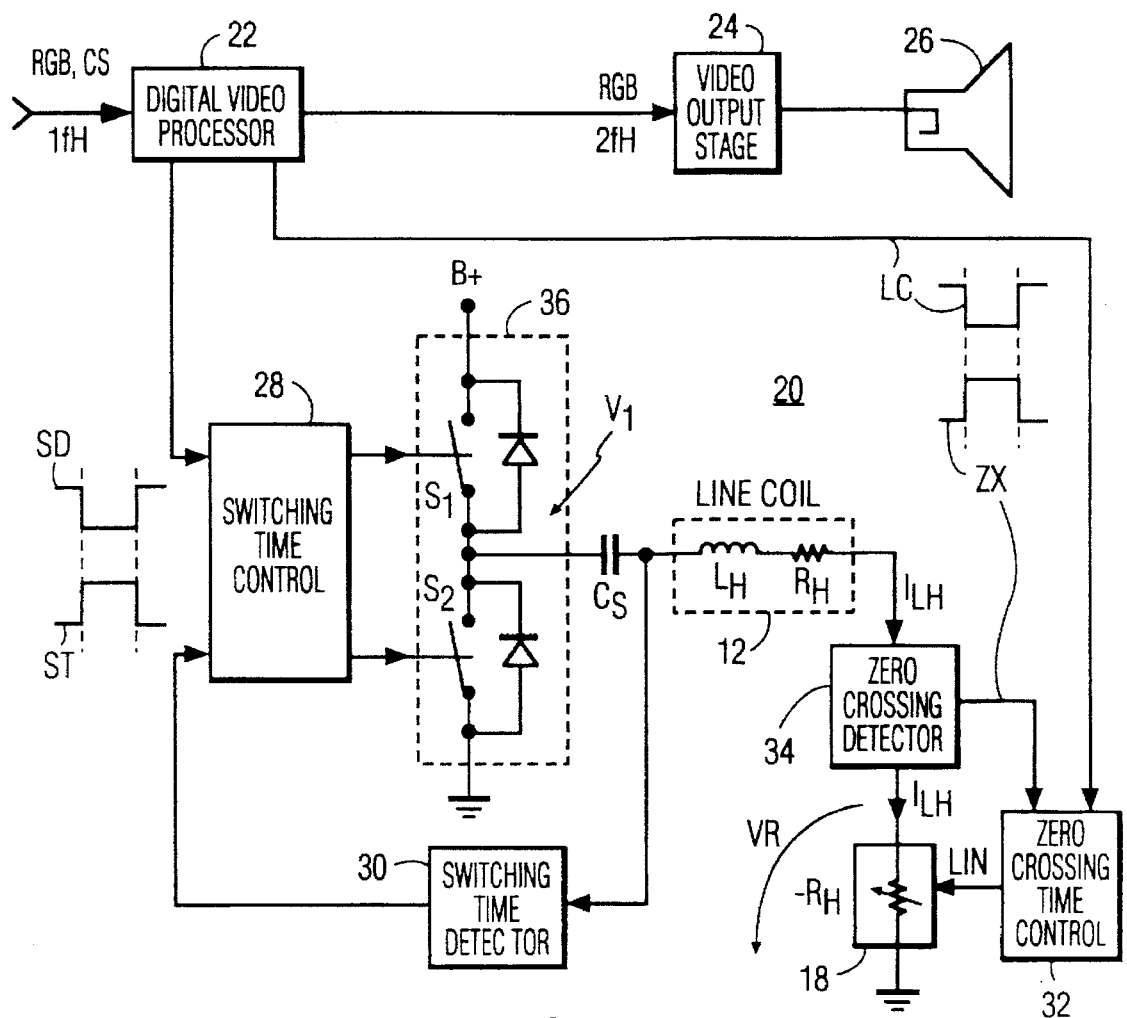
FIG. 7 is a block/schematic diagram of a deflection circuit generating a triangular deflection current.
Figure 8:
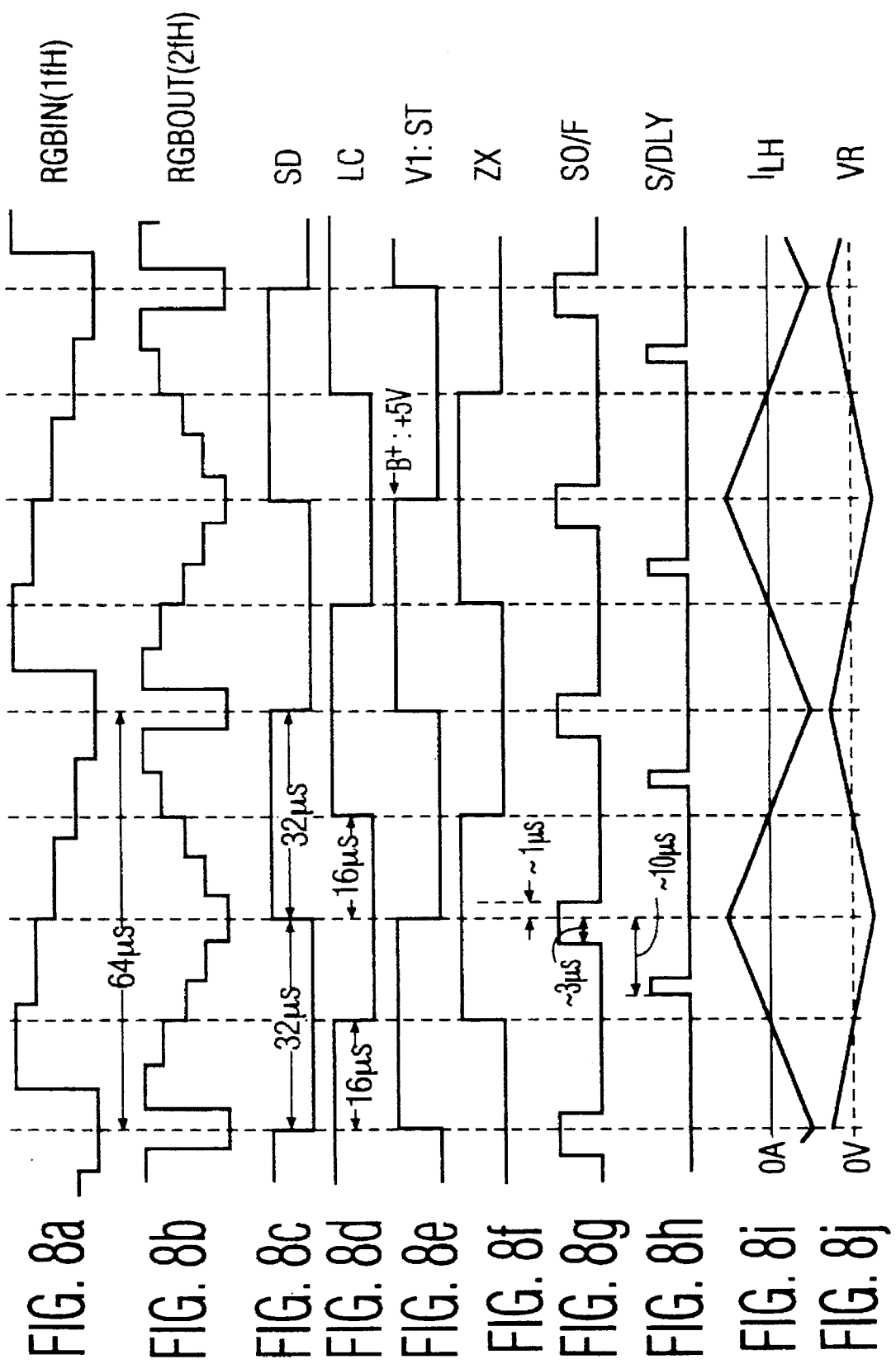
FIGS. 8(a) through 8(f) together form a timing diagram of waveforms useful for explaining the operation of the circuit shown in FIG. 7.

FIG. 7 shows a basic circuit for a video display system 20 which incorporates the bidirectional, triangular deflection system 10 shown in FIG. 4. In the display system, a digital video processor 22 includes a line doubler for converting the video to a format appropriate for $2f_H$ scanning. As a consequence of the bidirectional scanning, a time inversion of the video signal is required in alternative lines. This function is realized in the video processing circuit by storing every incoming line in a memory and reading it out twice with double speed, first in incoming order and then in opposite order. This results in double line speed, namely $2f_H$. An input RGB signal at $1f_H$ is shown in FIG. 8(a). An output RGB signal at $2f_H$ is shown in FIG. 8(b). A video output stage 24 provides signals for driving a cathode ray tube 26.

The video processor also provides timing/synchronization signals necessary for generating a raster with good mirror symmetry, including a scan direction signal (SD) and a line center signal (LC). The SD signal, shown in FIG. 8(c), is an input to a switching time control 28. The SD signal indicates whether the line memory in the processor 22 is read out in incoming or opposite order, that is, whether the deflection has to scan forward or backward. The edges of the LC signal, shown in FIG. 8(d), indicate the center of the video information of a line, that is, when half the number of picture elements (or pixels) is read from memory.

The square wave voltage signal V1 is generated by a switching arrangement 36 including switches S1 and S2 in a half bridge configuration. Switches S1 and S2 operate responsive to the switching time control 28. Since the scan direction is a result of the status of the square wave voltage signal V1, the edges of signal V1 have to be locked to the edges of the SD signal. This can be done by controlling the switch-off times of switches S1 and S2, as the level transitions of signal V1 are caused by a switching off of switches S1 or S2. When signal SD is a logical LOW, square wave voltage V1 is a logical HIGH, providing a forward scan. When signal SD is HIGH, square wave voltage V1 is LOW, providing a reverse scan.

The square wave voltage signal V1 is coupled to the horizontal yoke 12 through an S-shaping capacitor $C_S$. Capacitor CS also assures that signal V1 has a zero DC value as applied to the yoke 12. A switching time detector 30 monitors signal V1 at the junction of the S-shaping capacitor and the yoke 12. The switching time detector generates a switching time signal (ST), shown in FIG. 8(e), having edges which represent the instants of the level transitions of signal V1. The edges of signal V1 are kept in phase with signal SD by the switching time control, which controls the switching instants of switches S1 and S2. Since signal SD has a duty cycle of 50%, signal V1 will also have a 50% duty cycle.

The yoke current $I_{L_H}$, shown in FIG. 8(i), flows through a zero crossing detector 34 and the negative resistance 18. The zero crossing detector monitors the yoke current $I_{L_H}$ and generates a zero crossing signal (ZX), shown in FIG. 8(f), having edges which represent the instants of the zero crossings of the yoke current $I_{L_H}$. The voltage signal VR, which represents the voltage drop across the negative resistance 18, is proportional to the yoke current flowing through it, but of opposite polarity to the yoke current, as shown in FIG. 8(j). The instant of the yoke current zero crossing provides information about the losses in the deflection circuit, namely the higher the losses, the earlier in time is the zero crossing. Without losses, the zero crossing is in the center of the line.

The LC signal and the ZX signal are inputs to a zero crossing time control 32. The zero crossing time control regulates the $-R_H$ value of negative resistance 18, such that signal ZX and signal LC are in phase with one another. The zero crossing instant of the deflection current is therefore locked to the edges of the LC.

Figure 9:
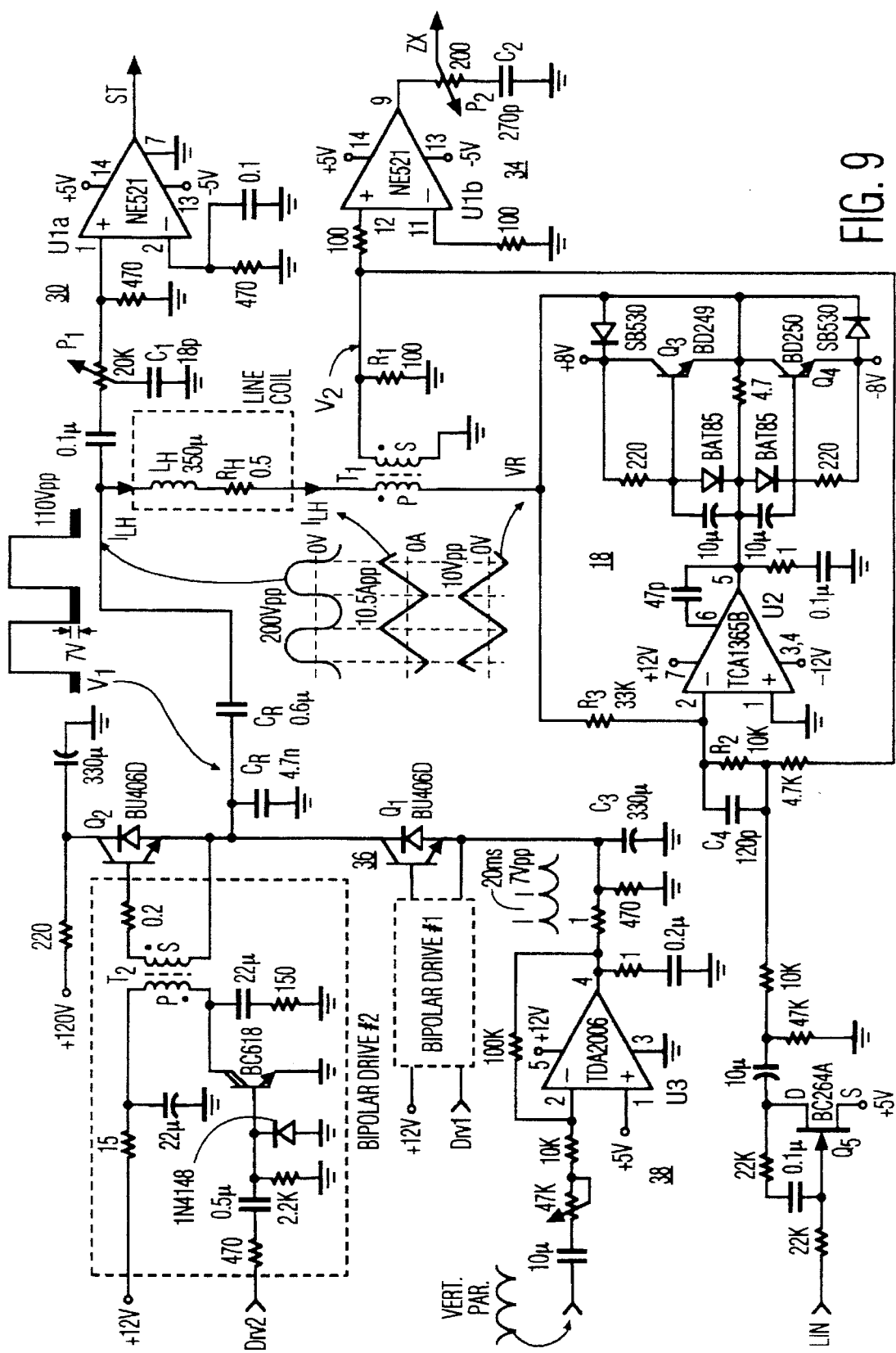
FIG. 9 is a detailed schematic diagram of a triangular horizontal deflection circuit, according to a first embodiment.
Figure 10:
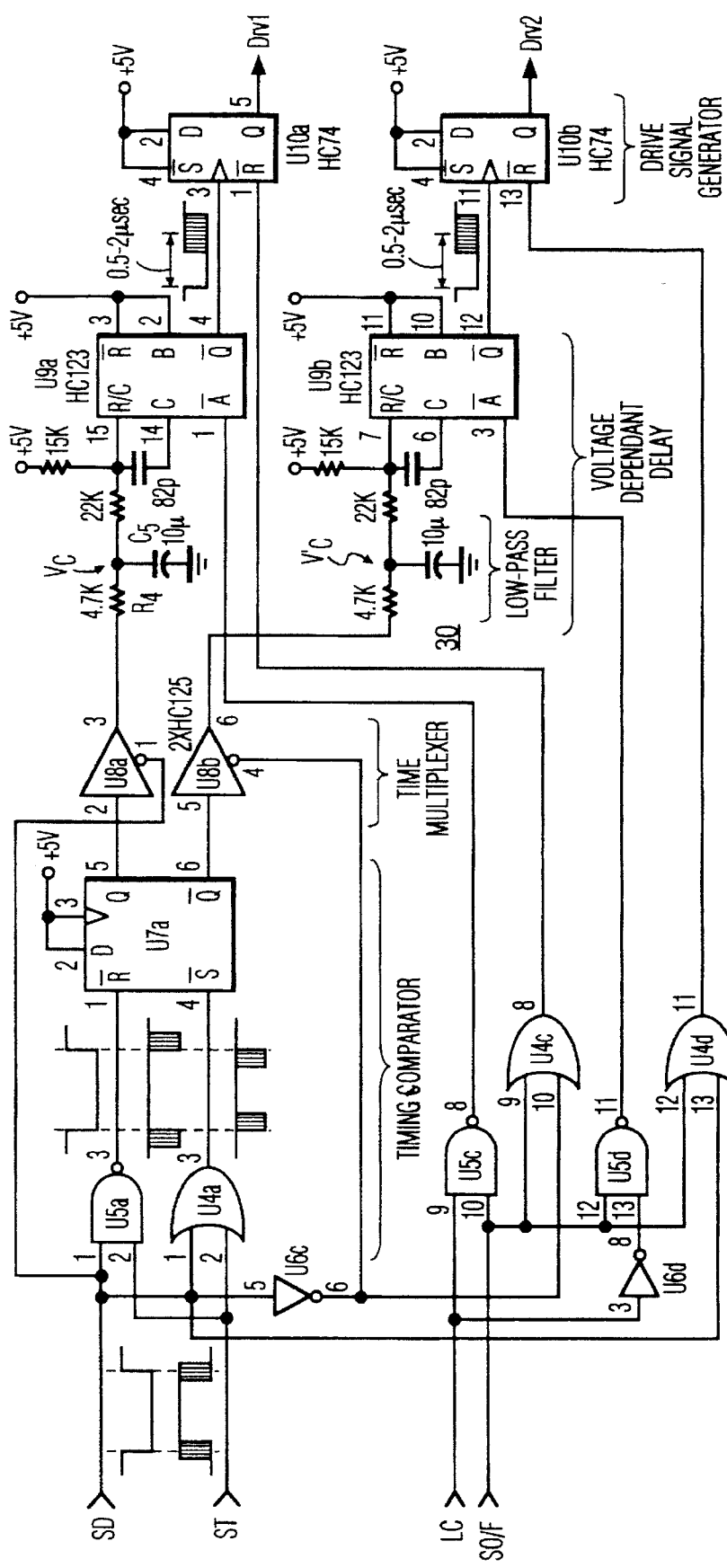
FIG. 10 is a detailed schematic diagram of a switching time control circuit, according to the first embodiment.
Figure 11:
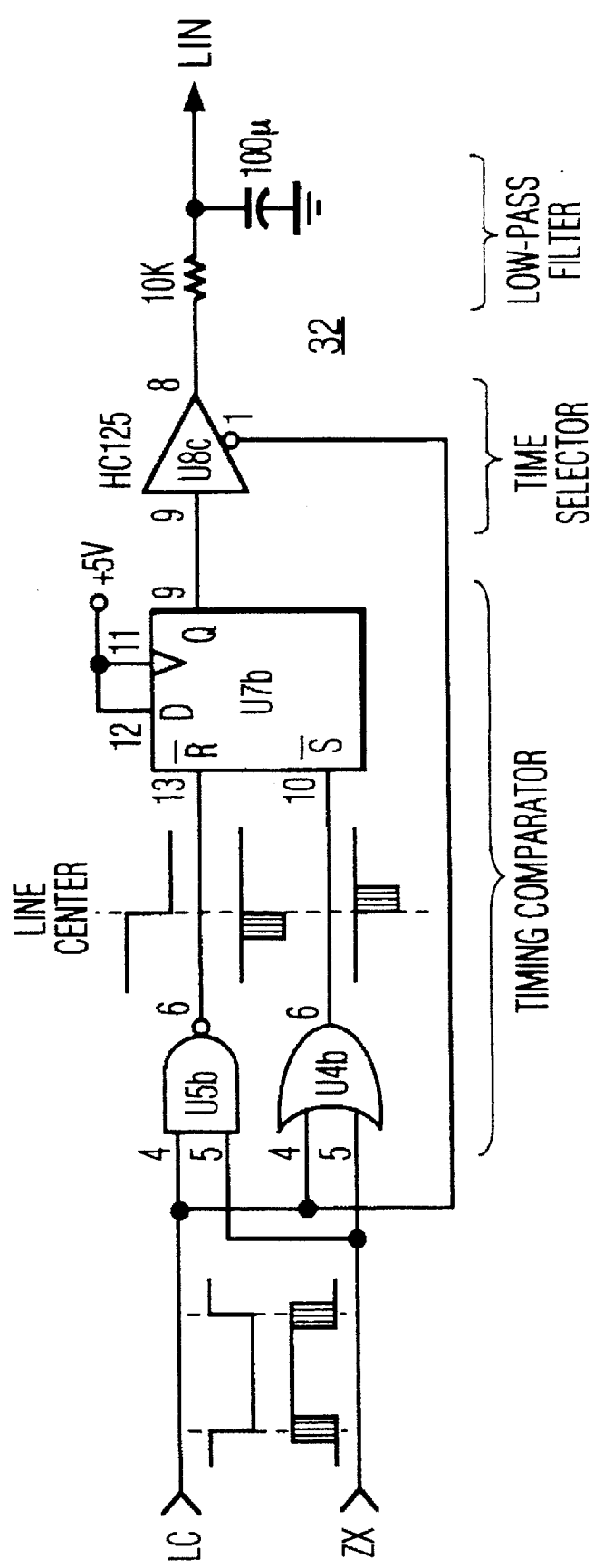
FIG. 11 is a detailed schematic diagram of a zero crossing time control circuit, according to the first embodiment.

FIGS. 9 to 11, taken together, are a complete circuit schematic for a first embodiment of a triangular line deflection system. FIG. 9 is directed to a triangular deflection circuit, FIG. 10 is directed to a switching time control and FIG. 10 is directed to a zero crossing time control. Beginning with FIG. 9, a switching arrangement 36 includes transistors Q1 and Q2, each having an integrated inverse diode. Transistors Q1 and Q2 are configured as a half bridge type switch to generate the square wave voltage signal V1. Signal V1 is fed to yoke $L_H$ via S-capacitor $C_S$. Capacitor $C_R$ decreases the rate of change (dV/dt) of the transitions of V1. This is necessary to avoid oscillations in the yoke after the transitions. The centers of the transitions of V1 are detected by comparator U1a and fed to the switching time control 30 (see FIG. 10) in the form of a digital signal denoted as the ST signal. A network including capacitor C1, connected to the slider of potentiometer P1, provides a small adjustable delay (0 to 50 nsec) to signal ST, to compensate for hysteresis misplacement and for delays of the video processor 22 and output stage 24.

Transformer T1 and resistor R1 transform the yoke current $I_{LH}$ into a voltage signal V2. The zero crossing instant of signal V2 is detected by U1b and fed to the zero crossing time control 32 (see FIG. 11) in digital form as the ZX signal. Here too, a small, adjustable delay is added to the signal by potentiometer P2 and capacitor C2, also to compensate for hysteresis misplacement and for delays of the video processor 22 and output stage 24.

The negative resistance 18 is embodied by a power operational amplifier U2 with a class A buffer stage formed by transistors Q3 and Q4, wired as an inverting amplifier with signal V2 as the input signal, where VR=−k*V2, for k>0. Since signal V2 is proportional to the yoke current $I_{L_H}$ and signal VR is proportional to signal V2 with opposite polarity, signal VR appears to $I_{L_H}$ as the voltage across a negative resistor. The gain of the amplifier is dependent on the ON-resistance of J-FET Q5, providing control over the value of the negative resistance by varying the gate to source voltage of transistor Q5 via a signal denoted as the linearity control voltage signal (LIN). Capacitor C4 causes a small phase shift to compensate for the delay of the amplifier.

The amplitude of square wave voltage signal V1 has to be modulated to correct for East-West raster distortion by an East-West correction circuit 38. The East-West correction can be accomplished by modulating the voltage at the lower terminal of the half-bridge switch by means of a power amplifier U3, which drives this point with a vertical parabola voltage signal. Capacitor C3 provides a low impedance path to the deflection current, to prevent the deflection current from flowing into the amplifier.

With reference to FIG. 10, the switching time control 30 locks the switching times of the signal ST, and with it the edges of signal V1, to the switching times of the SD signal by controlling the timing of the switch drive signals Drv1 and Drv2. The switching times of the falling and the rising edges of signal V1 are controlled independently, each with its own control loop. Both loops work in the same way, therefore only the loop for the rising edge of signal V1, or the ST signal, is explained.

The SD and ST signals are combined once with a NAND function in gate U5a and once with an OR function in gate U4a. When the edge of the ST signal is too early, the NAND gate produces a narrow reset pulse for flip/flop U7a. When the edge of the ST signal is too late, the OR gate produces a set pulse for flip/flop U7a. Thus, this first stage acts as a timing comparator for the SD and ST signals. The Q output of flip/flop U7a is transferred via buffer U8a to a low pass filter formed by resistor R4 and capacitor C5, resulting in a control voltage VC. During the high state of the SD signal, the Q output of flip/flop U7a is disconnected from resistor R4 by disabling the output of U8a, a three-state device, since during this time flip/flop U7a carries information for the second loop, being a time multiplexed timing comparator. A one-shot U9a has an output pulse width, from the inverted Q output, in the range of approximately 0.5 to 2 μsec., controlled by voltage VC. A high voltage results in a short pulse and a low voltage results in a long pulse. This stage is used as a voltage controlled time delay. The LC signal and the Start On/Off signal (SO/F) are inputs to a NAND gate U5c. The one-shot is triggered approximately 3 μsec. before the falling edge of the SD signal, at the falling edge of the output of the NAND gate U5c.

The SO/F signal is an auxiliary signal generated by the video circuit, synchronous to the SD and LC control signals. The main function of the SO/F signal is to alternately trigger the one-shots U9a and U9b in order to generate the width controlled output pulses. This is accomplished in both embodiments by combining the SO/F or S/DLY signal with the LC signal. The triggering edge is the inverted rising edge of the S/OF or S/DLY signal. Another function of the SO/F signal is to alternately reset flip/flops U10a and U10b, in order to alternately switch on the power transistors Q1 and Q2. The falling edges of the SO/F signal are utilized for this purpose. The alternating is accomplished by combining the SO/F signal with the SD signal. The switching on timing of the power transistors is not critical, as the switching on just has to occur sometime during the first half of trace.

The end of the width controlled pulse from flip/flop U9a triggers flip/flop U10a, setting the Drv1 output high. This causes transistor Q1 (see FIG. 9) to turn off, resulting in a low-to-high transition of voltage signal V1. There is an undefined delay (approximately 1.5 μsec.) between the low-to-high transitions of Drv1 and signal V1, caused mainly by the storage time of the switch transistor. The delay varies with temperature and yoke current is amplitude but is fully compensated by the switch time control 30. Around 1 μsec. after the rising edge of the SD signal, transistor Q1 is turned on by resetting flip/flop U10a with a combination of the SD signal and the SO/F signal, provided by OR gate U4c. The turn-on timing is not critical, since the reverse diode D1 conducts the yoke current during the first half of trace.

With reference to FIG. 11, the zero crossing time control 32 is the same circuit as the first part of the switching time control 30, namely the timing comparator and low pass filter. The zero crossing time control locks the rising edge of the ZX signal to the falling edge of the LC signal by varying the value of the negative resistance $-R_H$ via the LIN signal, as described before. Due to the symmetry of the yoke current, it is sufficient to control the zero crossing instant of the yoke current only for one scan direction. The order of the series coupling of the zero crossing detector 34 and the negative resistance 18 may be reversed.

Figure 12:
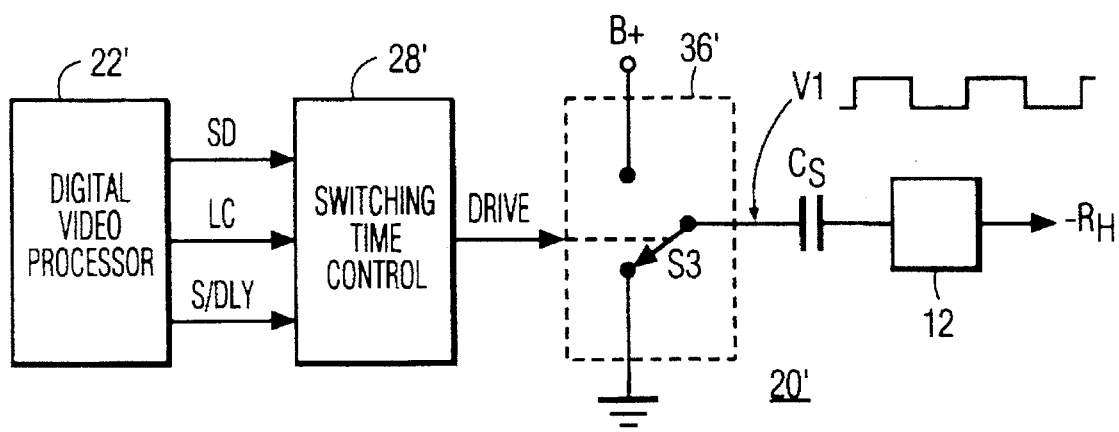
FIG. 12 is a block diagram of a portion of a triangular horizontal deflection system, according to a second embodiment.

FIG. 12 is a block diagram of a portion of a second embodiment of a triangular line deflection system 20'. Portions of the system not illustrated or explained in detail are in accordance with the first embodiment. In the second embodiment, a digital video processor 22' supplies the same SD signal, the same LC signal and a start delay signal (S/DLY) to a switching time control 28'. A switching arrangement 36' has a single switch S3 controlled by a single Drive signal generated by the switching time control 28'. A symmetrical square waveform signal V1 is coupled to a horizontal yoke 12 through an S-shaping capacitor CS, as in the first embodiment. The yoke current flows through a negative resistance 18 and has a triangular shape as in the first embodiment.

Figure 13:
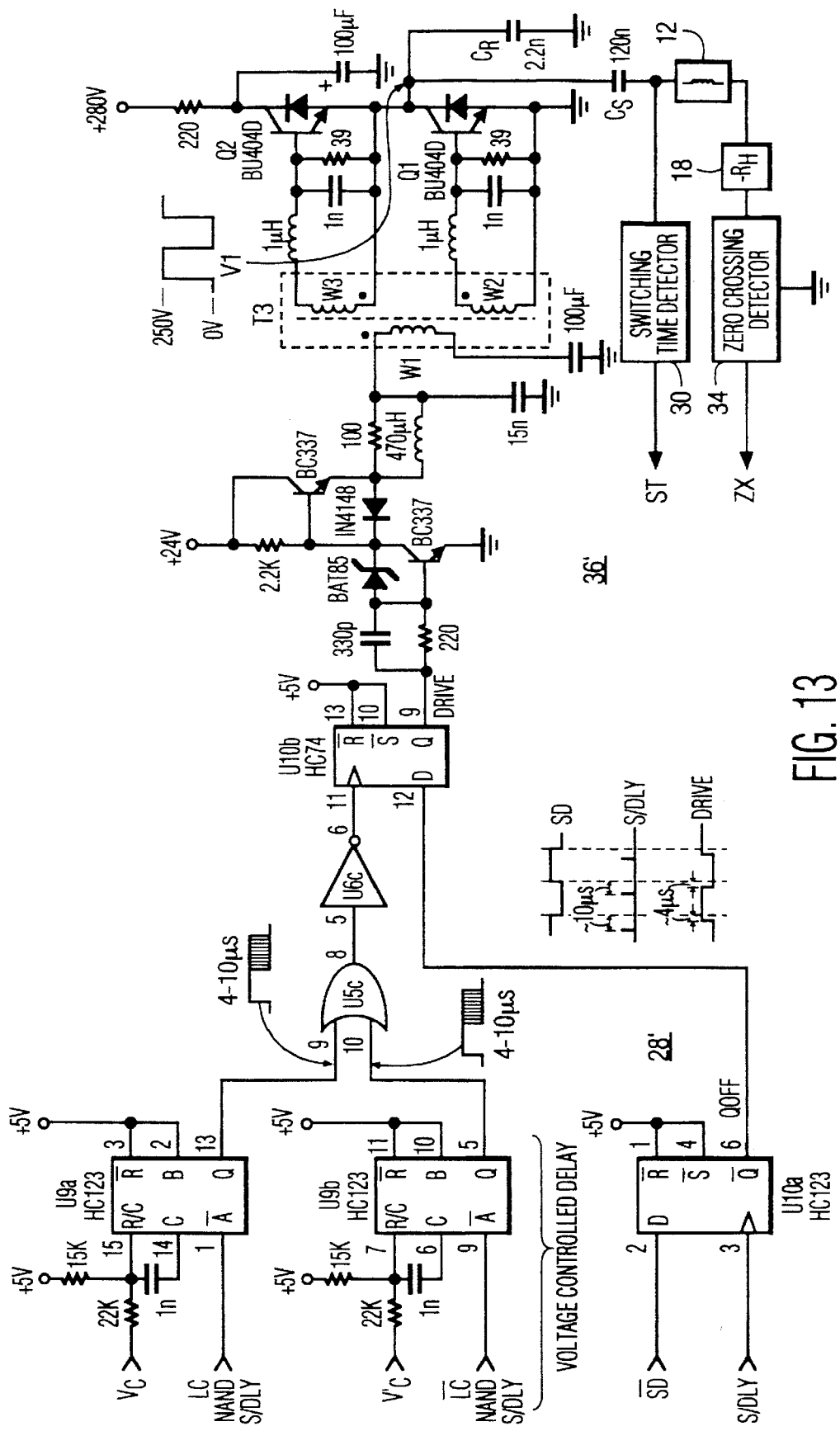
FIG. 13 is a detailed schematic diagram of a portion of a triangular horizontal deflection system, according to the second embodiment.

FIG. 13 illustrates the details of the block diagram of FIG. 12. The second embodiment differs in two principal respects. Firstly, a single Drive signal is generated instead of two signals Drv1 and Drv2 as in the first embodiment. Secondly, transistors Q1 and Q2 are driven through a single transformer T3 instead of two transformers T2. One-shots U9a and U9b receive the same respective input signals VC and V'C as in FIG. 10. However, the outputs of these one-shots are taken from the noninverting Q outputs instead of the inverted Q outputs.

Flip/flops U10a and U10b are used differently. Flip/flop U10a receives the inverted LC signal as a D input and the S/DLY signal, shown in FIG. 8(h), as a clock input. The inverted Q output is coupled to the D input of flip/flop U10b. The Q outputs of one-shots U9a and U9b are inputs to a NOR gate U5c. The output of NOR gate U5c is an input to inverter U6c. The output of inverter U6c is the clock input to flip/flop U10b. The Q output of flip/flop U10b is the single Drive signal.

As in the first embodiment, the control of the two edges of signal V1 is the same, and the control of only one edge is explained in detail. One-shot U9a is triggered by the falling edge of the NAND gate receiving the LC and S/DLY signals (see U5c in FIG. 10) approximately 10 μsec. before the falling edge of the SD signal. The pulse width output increases with VC, and vice versa, providing the voltage controlled time delay. The output of one-shot U9a sets the output (the single Drive signal) of flip/flop U10b high via the OR gate U5c and the inverter U6c. This causes transistor Q1 to turn off, resulting in a low to high transition of the voltage V1. In this embodiment, the supply voltage for transistors Q1 and Q2 is +280 volts, more than double that of the first embodiment.

The main function of the S/DLY signal is the same as the SO/F signal in the first embodiment, namely to alternately trigger the one-shots U9a and U9b, in order to generate the width controlled output pulses. This is accomplished by combining the S/DLY signal with the LC signal. The triggering edge is the inverted rising edge of the S/DLY signal. Another function of the S/DLY signal, which is different than the SO/F signal, is to generate a signal (QOFF) which determines which of the power transistors Q1 and Q2 has to be switched off. The QOFF signal is generated by using the SD and S/DLY signals and flip/flop U10a. The QOFF signal is applied to the D input of flip/flop U10b. When the QOFF signal is low, transistor Q2 will be switched off. When the QOFF signal is high, transistor Q1 will be switched off. Since both power transistors are driven by the same driver, the Drive signal contains only the switching off commands. The switching on of the power transistors is done automatically, within the driver stage.

The driver circuit and the storage time of transistor Q1 cause is an undefined delay of approximately 4 μsec. between the low to high transitions of the Drive signal and the V1 signal. The delay varies with temperature and yoke current amplitude but is fully compensated for by the switching time control loop. The turn on time of the transistors is not critical, because the integrated reverse diodes conduct the yoke current immediately after the level transitions of signal V1.

As in the first embodiment, the V1 signal is coupled to the yoke 18 through an S-shaping capacitor CS. Signal V1 is also coupled to a switching time detector 30, which generates the ST signal. A zero crossing detector 34 generates the ZX signal.

What is claimed is:

1. A bidirectional horizontal deflection system, comprising:

a horizontal deflection yoke having input and output terminals;

a source of a symmetrical square wave signal, having zero average value, coupled to said input terminal; and, a negative resistance coupled to said output terminal and having a negative resistance value which compensates for resistive losses in said yoke, whereby a yoke current generated in said yoke responsive to said square wave signal will be a symmetrical triangular waveform.

2. The system of claim 1, wherein said square wave signal is coupled to said input terminal through an S-shaping capacitance, which also assures said zero average value.

3. The system of claim 1, further comprising a zero value crossing control loop for said yoke current, said negative resistance value being adjusted to assure successive zero value crossings of said yoke current are coincident in time with each center of successive horizontal scan lines.

4. The system of claim 3, wherein said zero value crossing control loop comprises a phase detector for aligning in phase a level transition of a binary control signal in which said level transition coincides in time with each said center of said successive horizontal scan lines and each successive zero value crossing of said yoke current.

5. The system of claim 1, further comprising a switching time control loop for said square wave signal, said source of said square wave being adjusted to assure successive level transitions of said square wave signal are coincident in time with successive changes of scanning direction.

6. The system of claim 5, wherein a signal representing said successive changes of scanning direction has a 50% duty cycle, assuring said symmetry of said square wave signal.

7. The system of claim 5, wherein said switching time control loop comprises binary signal edge detectors which determine whether said level transitions of said square wave signal occur before or after level transitions of a binary control signal, said level transitions of said binary control signal being coincident in time with successive changes of scanning direction.

8. The system of claim 7, wherein said binary control signal has a 50% duty cycle, assuring said symmetry of said square wave signal.

9. A bidirectional horizontal deflection system, comprising:

a horizontal deflection yoke having input and output terminals;

an adjustable source of a symmetrical square wave signal capacitively coupled to said input terminal;

a negative resistance coupled to said output terminal and having an adjustable negative resistance value which compensates for resistive losses in said yoke, whereby a yoke current generated in said yoke responsive to said square wave signal will be a symmetrical triangular waveform;

a zero value crossing control loop for said triangular yoke current, said negative resistance value being adjusted to assure successive zero value crossings of said yoke current are coincident in time with each center of successive horizontal scan lines; and, a switching time control loop for said square wave signal, said source of said square wave being adjusted to assure successive level transitions of said square wave signal are coincident in time with each change of scanning direction.

10. The system of claim 9, wherein said square wave signal is coupled to said input terminal through an S-shaping capacitance.

11. The system of claim 9, wherein a signal representing said successive changes of scanning direction has a 50% duty cycle.

12. A video display system, comprising:

a video display;

a video processor having memory blocks for storing successive lines of video data, a first set of alternate ones of said lines of video data being read from said memory blocks in forward order and a second set of remaining alternate lines of video being read from said memory blocks in reverse order;

a horizontal deflection yoke having input and output terminals;

a source of a symmetrical square wave signal, having zero average value, coupled to said input terminal; and, a negative resistance coupled to said output terminal and having a negative resistance value which compensates for resistive losses in said yoke, whereby a yoke current generated in said yoke responsive to said square wave signal will be a symmetrical triangular waveform.

13. The system of claim 12, further comprising a zero value crossing control loop for said triangular yoke current, said negative resistance value being adjusted to assure successive zero value crossings of said yoke current are coincident in time with each center of successive horizontal scan lines.

14. The system of claim 12, further comprising a switching time control loop for said square wave signal, said source of said square wave being adjusted to assure successive level transitions of said square wave signal are coincident in time with each change of scanning direction.

15. The system of claim 12, further comprising:

an S-shaping capacitance coupling said square wave signal to said input terminal;

a zero value crossing control loop for said triangular yoke current, said negative resistance value being adjusted to assure successive zero value crossings of said yoke current are coincident in time with each center of successive horizontal scan lines; and, a switching time control loop for said square wave signal, said source of said square wave being adjusted to assure successive level transitions of said square wave signal are coincident in time with each change of scanning direction.

16. The system of claim 12, wherein said video processor generates a first control signal having level transitions identifying when one half of each successive video line has been read from one of said memory blocks and generates a second control signal having level transitions identifying each change of scanning direction prior to reading each line of video from one of said memory blocks.

17. The system of claim 16, wherein:

said zero value crossing control loop comprises a phase detector for aligning in phase said level transitions of said first control signal with each said successive zero value crossing of said yoke current; and, said switching time control loop comprises binary signal edge detectors which determine whether said level transitions of said square wave signal occur before or after said level transitions of said second control signal.

* * * * *